March 27, 1951  E. B. JAEGER  2,546,363
AIR CIRCULATION CONTROL FOR REFRIGERATORS
Filed Oct. 19, 1946  8 Sheets-Sheet 1
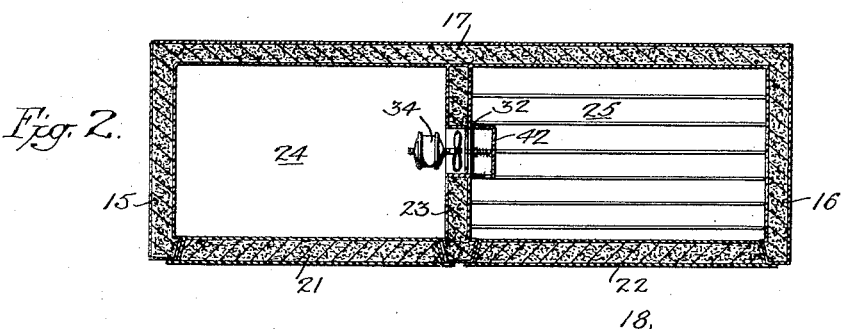
Fig. 2.
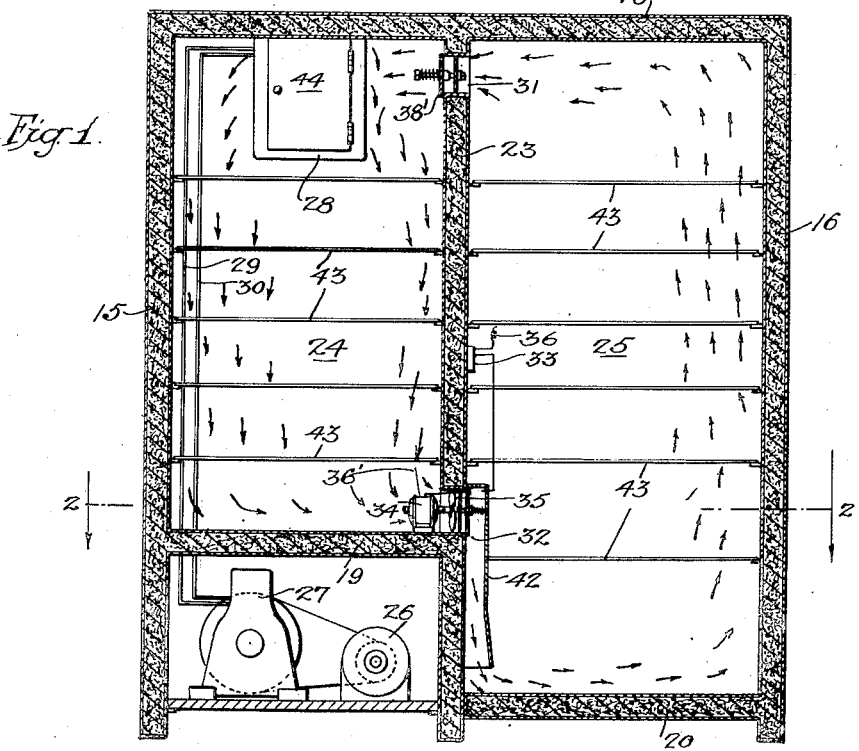
Fig. 1.
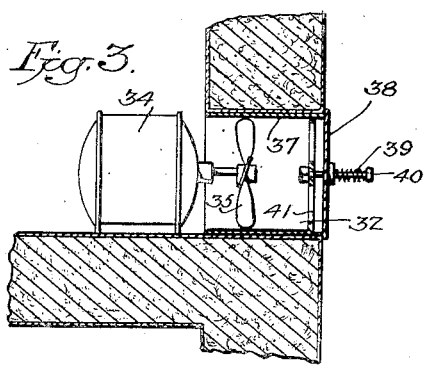
Fig. 3.
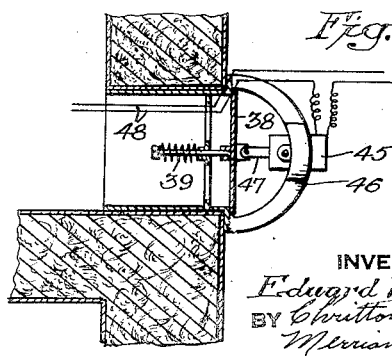
Fig. 3ᵃ.
INVENTOR
Edward B. Jaeger
BY Chritton, Schroeder
Merriam & Hofgren
ATTORNEYS March 27, 1951  E. B. JAEGER  2,546,363
AIR CIRCULATION CONTROL FOR REFRIGERATORS
Filed Oct. 19, 1946  8 Sheets-Sheet 2

INVENTOR
Edward B. Jaeger
BY Chritton, Schroeder
Merriam & Hofgren
ATTORNEYS

March 27, 1951 E. B. JAEGER 2,546,363
AIR CIRCULATION CONTROL FOR REFRIGERATORS
Filed Oct. 19, 1946 8 Sheets-Sheet 3
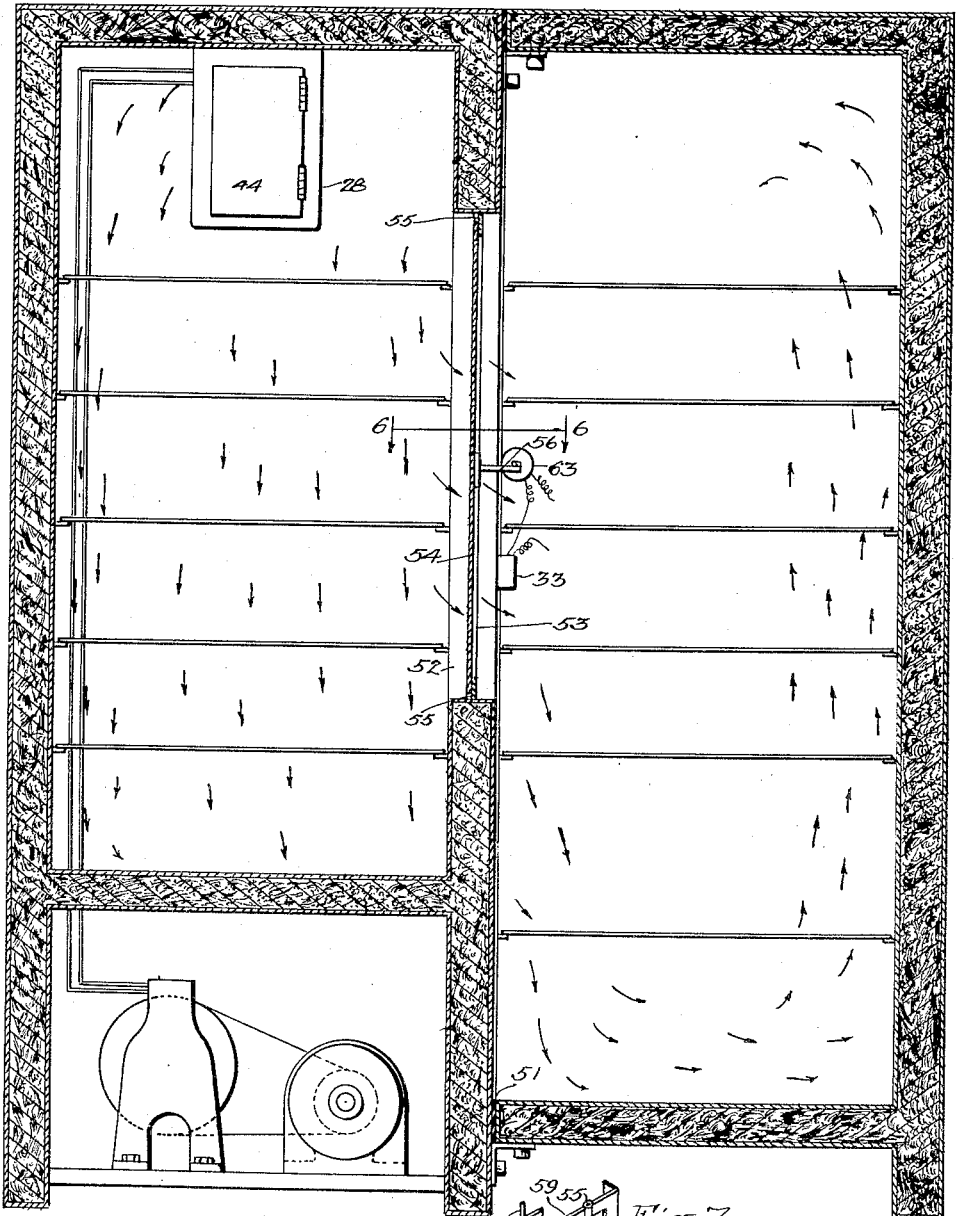
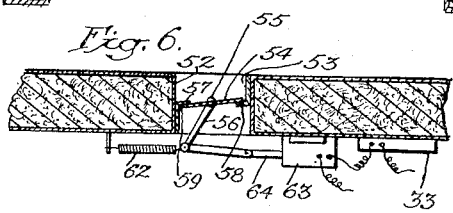
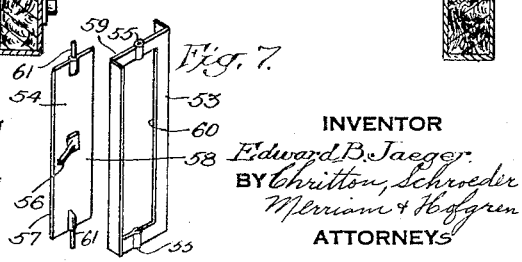
INVENTOR
Edward B. Jaeger
BY Chritton, Schroeder
Merriam & Hofgren
ATTORNEYS March 27, 1951 E. B. JAEGER 2,546,363
AIR CIRCULATION CONTROL FOR REFRIGERATORS
Filed Oct. 19, 1946 8 Sheets-Sheet 4

INVENTOR.
Edward B. Jaeger
BY Chritton, Schroeder, Merriam & Hofgren
ATTORNEYS

March 27, 1951  E. B. JAEGER  2,546,363
AIR CIRCULATION CONTROL FOR REFRIGERATORS
Filed Oct. 19, 1946  8 Sheets-Sheet 5
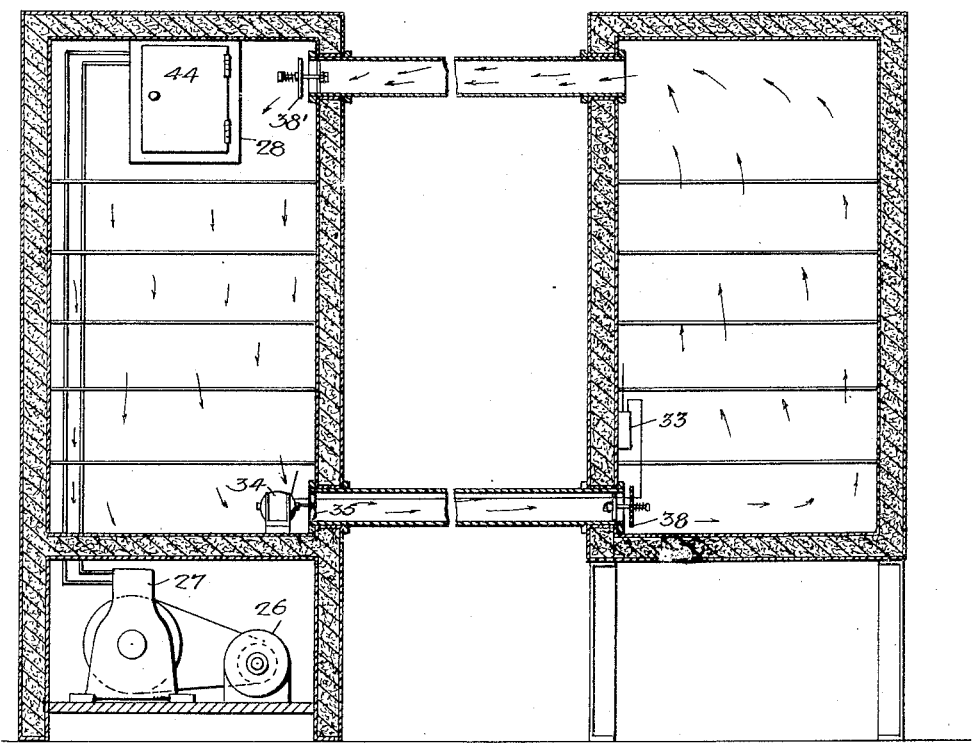
Fig. 9.
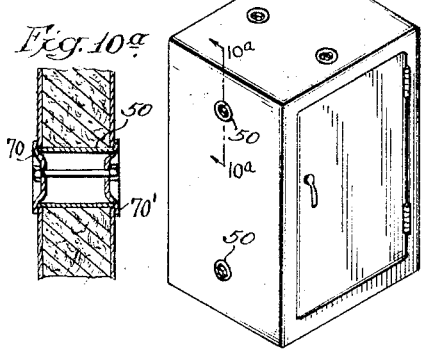
Fig. 10.
Fig. 10a.
INVENTOR
Edward B. Jaeger
BY Chritton, Schroeder
Merriam & Hofgren
ATTORNEYS

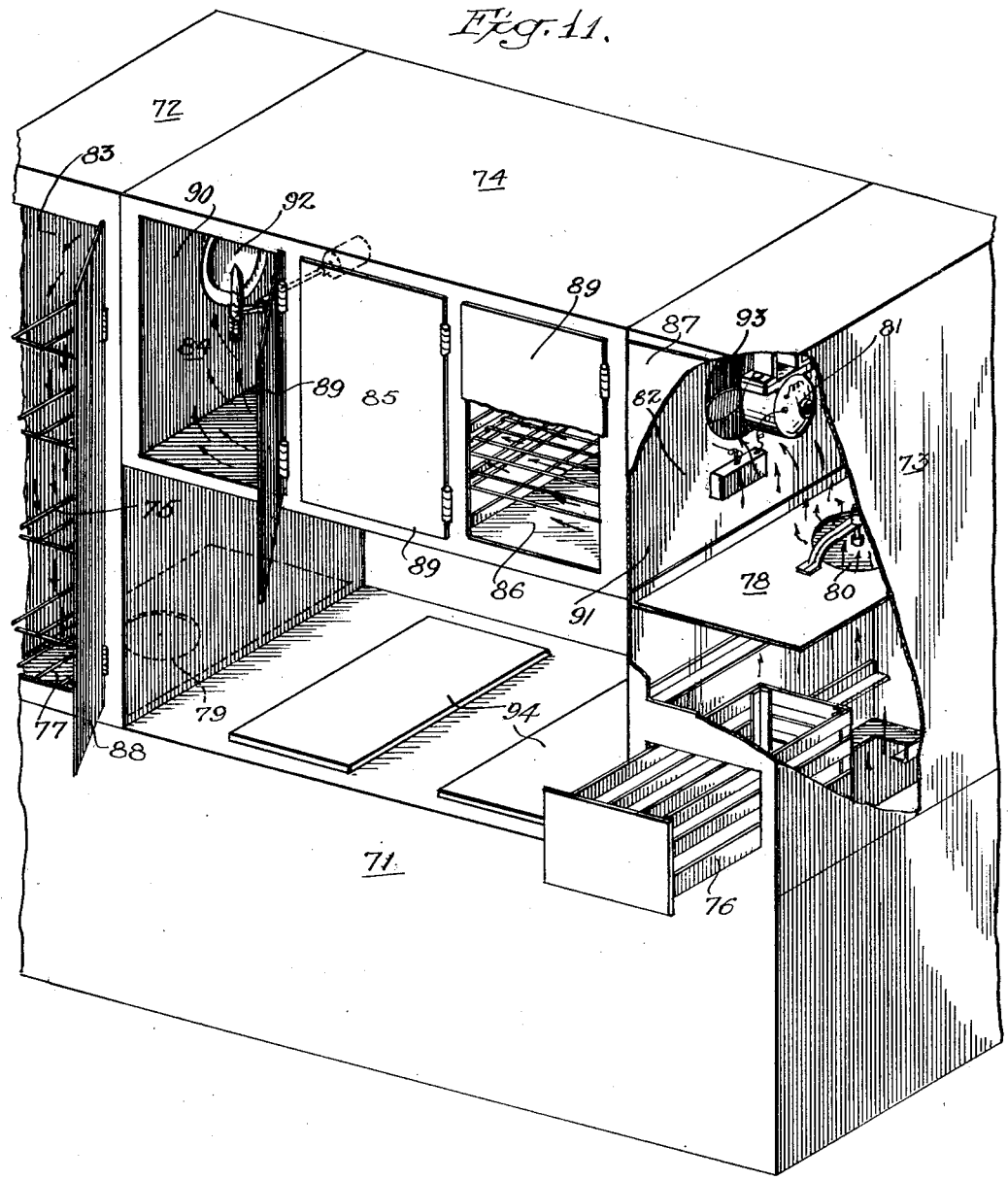

March 27, 1951 E. B. JAEGER 2,546,363
AIR CIRCULATION CONTROL FOR REFRIGERATORS
Filed Oct. 19, 1946 8 Sheets-Sheet 7
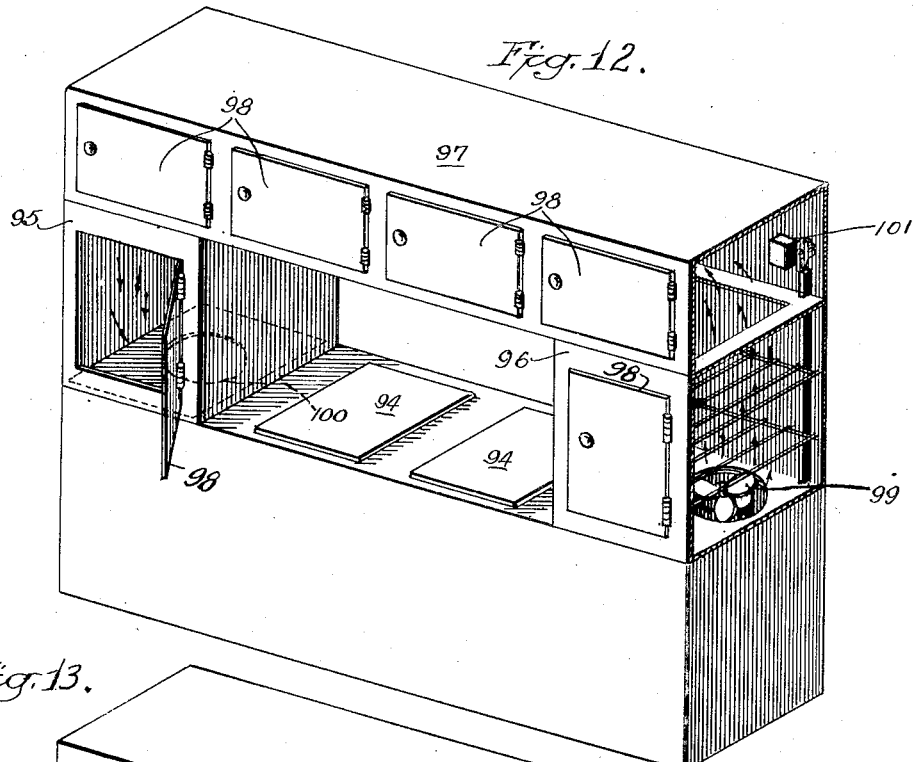
Fig. 12.
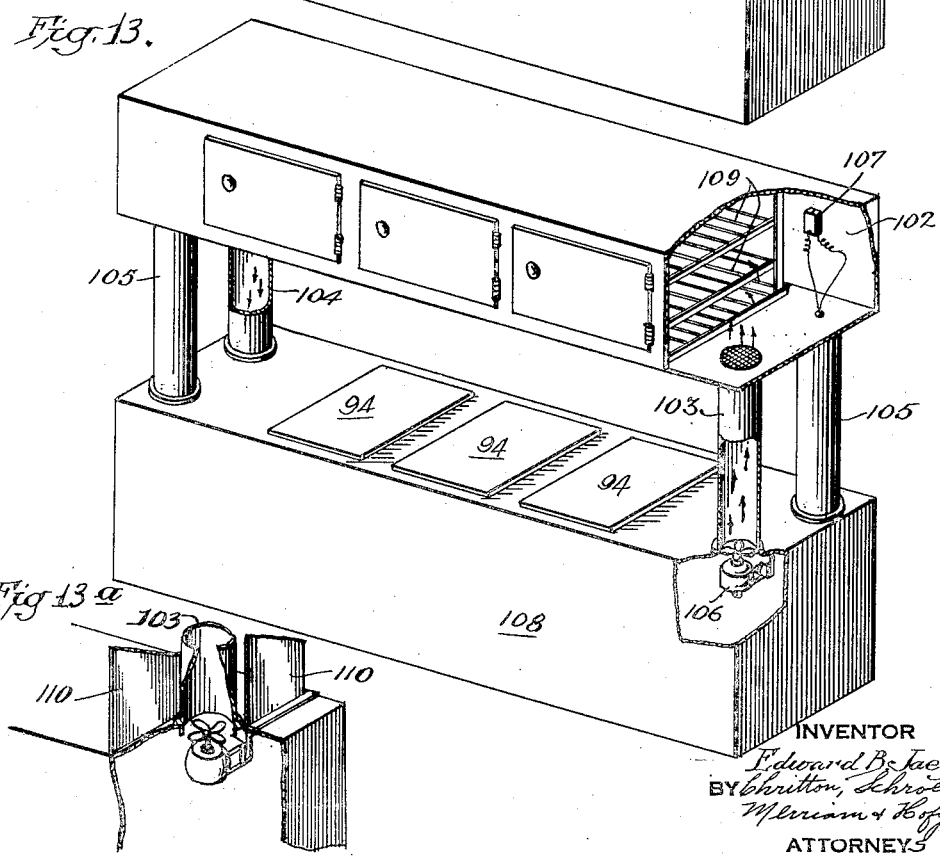
Fig. 13.
Fig. 13a.
INVENTOR
Edward B. Jaeger
BY Britton, Schroeder
Merriam & Hofgren
ATTORNEYS March 27, 1951 E. B. JAEGER 2,546,363
AIR CIRCULATION CONTROL FOR REFRIGERATORS
Filed Oct. 19, 1946 8 Sheets-Sheet 8

INVENTOR
Edward B. Jaeger
BY Chritton, Schroeder
Merriam & Hofgren
ATTORNEYS

Patented Mar. 27, 1951

2,546,363

UNITED STATES PATENT OFFICE 2,546,363

AIR CIRCULATION CONTROL FOR REFRIGERATORS

Edward B. Jaeger, Chicago, Ill.

Application October 19, 1946, Serial No. 704,458

6 Claims. (Cl. 62—2)

This invention relates to improvements in refrigeration and refrigerators, and more particularly to refrigeration apparatus including an insulated storage compartment or compartments designed to be cooled by bringing cold air into such compartments from outside thereof, as in an arrangement whereby cold air in the atmosphere or in master refrigerating means (that is, a refrigerator having a food compartment space therein designed for containing food articles, and also having a cooling unit of its own, a means for effective heat exchange of air with a refrigerant or other means of cooling therein, connected directly or indirectly with means for operating such cooling means, such as, for example, a motor compressor unit), can be circulated as desired into a refrigerator compartment of the type with which we are here particularly concerned, sometimes hereinafter termed auxiliary refrigerating means, that is, a refrigerator adapted to be cooled by bringing cold air thereinto.

One feature is that the cooling of the auxiliary may be wholly by controlled air circulation between it and a master refrigerator, and this circulation may be forced or by gravity.

One purpose of the invention is to permit use of cold air from an existing master refrigerator to take care of additional required refrigeration within a space which is to be cooled, but not below the temperature of the air in the master refrigerator.

A further purpose is to withdraw cold air from a master refrigerator of the so called "quick freezing" or "freezer" type, which is capable of maintaining extremely cold temperatures, for example, −15° F., and deliver it to an auxiliary refrigerator or refrigerators, so as to maintain temperatures therein comparable to that of a normal, domestic, master refrigerator or if desired, above or below such temperatures.

A further purpose is to provide means for securing refrigeration space for food products which require cool temperatures but are comparatively insensitive to spoilage and hence do not require such low temperatures as are available and are required in master refrigerators, and in which the refrigeration required for the proper use of the auxiliary refrigerator space is secured by means of direct air circulation between a master refrigerator and the added refrigeration space contemplated.

A further purpose is to provide means for controlled gravity air circulation between a master refrigerator and two interconnected auxiliary refrigerators, wherein various and isolated temperatures may be secured.

A further purpose is to provide a means for controlled air circulation from a master to an auxiliary refrigerator.

A further purpose is to provide inlet and outlet air passages from a master refrigerator to an auxiliary refrigerator and to close one or both of these passages through a pressure control or through a thermostatically operated control when circulation is not desired.

A further purpose is to provide additional refrigeration from a master refrigerator by means of air circulation along a path between the master and an auxiliary, controlled by a thermostat in the auxiliary and an electric fan or other suction or pressure pump operating against a resilient force tending to close the path.

I maintain a temperature differential between the master and auxiliary, save on equipment for the auxiliary, both as to cooling unit and as to insulation, etc., and avoid expenditure of energy on meeting temperature conditions which are unnecessary for the intended content. I thus secure and maintain a temperature in the auxiliary refrigerator which may be as low as that of the master but which may be higher and suitable for foods that do not require extreme cold.

Further purposes will appear in the specification and in the claims.

I have preferred to illustrate my invention by a few desirable forms only, selecting forms which to advantage illustrate the principles involved without attempting to show all of the different ways in which these principles may be utilized.

Figure 1 is a sectional elevation of a single refrigerator box which is partitioned and connected so as to embody both master and auxiliary functions.

Figure 2 is a horizontal sectional view along line 2—2 of Figure 1.

Figures 3 and 3ª are enlargements of part of the section in Figure 1 and a modification thereof respectively.

Figures 4, 5, 8 and 9 are sectional elevations of forms modified as compared with Figure 1.

Figure 4:
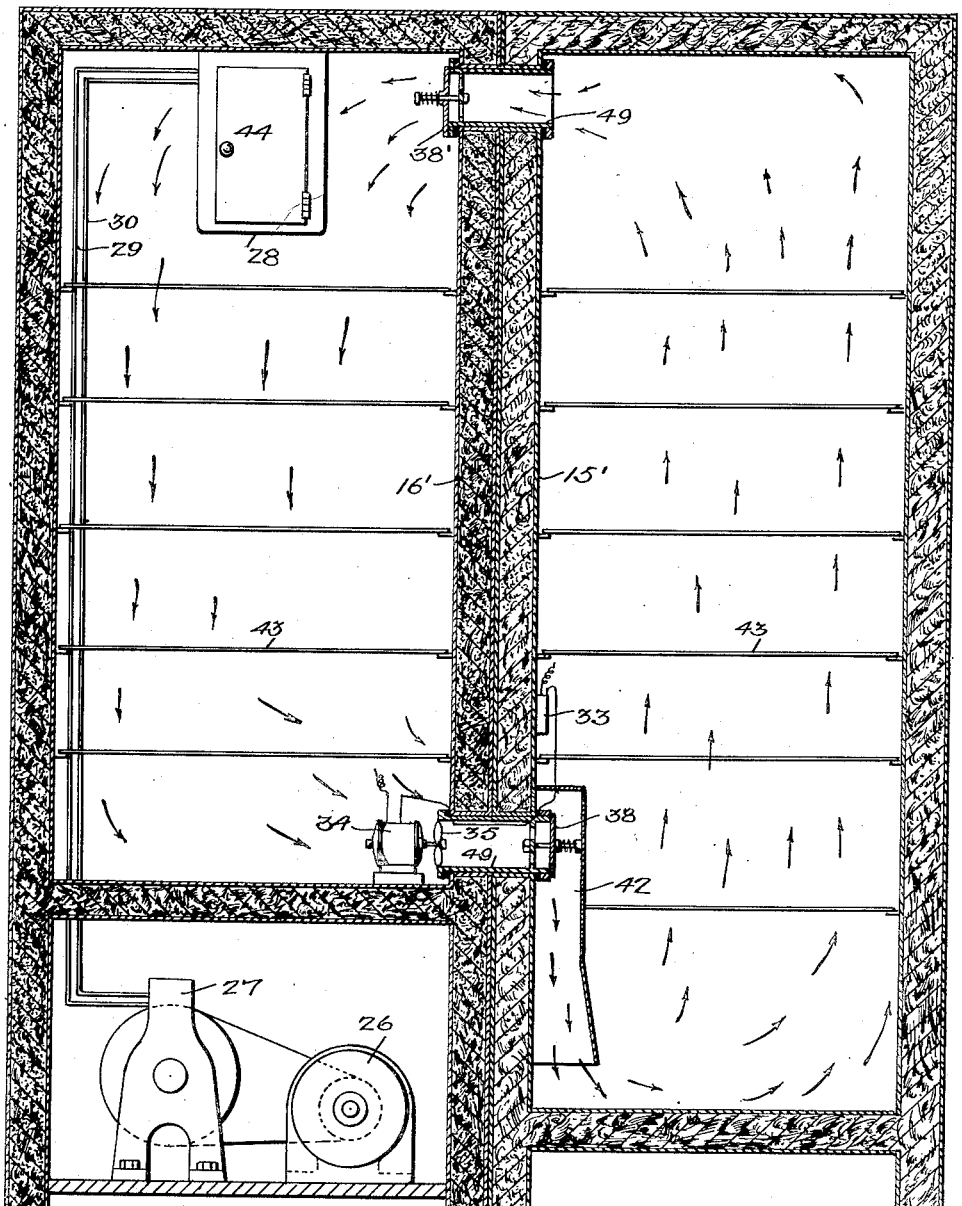

Figure 4ª is a fragmentary section showing a modification of the valve and pump arrangement of Fig. 4;

Figure 6 is a fragmentary section of Figure 5 upon lines 6—6.

Figure 7 is a disassembled perspective of parts seen in Figure 5.

Figures 10, 11, 12, 13, 14, and 15 are perspectives of refrigerators showing modifications in most of which parts are broken away.

Figure 10ª is a section upon line 10ª—10ª of Figure 10.

Figure 13ª is a fragmentary perspective of a modification of Figure 13.

Heretofore the accepted electric or gas refrigerator was composed of solid, well insulated walls, floor and ceiling with a door located in one wall and a small opening or openings to permit the entrance of certain refrigeration equipment such, for example, as tubes containing refrigerant and/or electrical equipment. Each refrigerator normally carried the rest of its own refrigeration unit outside of the insulated space.

It will be evident that the present invention is applicable to gas, electric or any other type of master refrigerator, providing such refrigerator has sufficient refrigeration to properly cool the auxiliary refrigerator.

The present invention provides means and a method of utilizing a certain amount of the cooled air contained in any such refrigerator, which for the purpose of my invention may be termed a "master" refrigerator for a permissibly separate but connected "auxiliary" refrigerator and at the same time of controlling the temperature of the auxiliary through a thermostat within the auxiliary and closures for the connections, and of thermostatically operated motor fans or pumps with or without specific means for opening the closures.

It has been common in refrigerators to have compartments in which extra cold or freezing temperatures could be maintained. The remaining space in the refrigerator was supposed to be and practically was of one temperature, which in many cases could be raised or lowered by means of a thermostatically controlled device commonly called a thermostat. The result was that those foods requiring an intermediate but not a very cold temperature, of say 45 to 65 degrees F., such as some vegetables and fruits, smoked meats, etc., were required to endure such low temperatures as were required for such foods as poultry, fresh ham, fish, etc., or vice versa. In either case there was a waste of refrigeration space. With some candies definite harm would be done, chocolate creams, for example, being given an undesirable "bloom."

In many homes and even in places of business, the quantity of foods which require really low temperatures are relatively small as compared with the quantity of foods, etc., which are not readily spoiled but which must be kept cool as distinguished from quite cold. The structures of the figures are intended to take care of such installations with a minimum expense for operation and with a decided temperature differential between that of the master refrigerator and that of an auxiliary refrigerator, adapted, primarily for such higher temperatures, used to supplement it. Thermostatic control within the auxiliary causes pumping or forcing of cold air from the master into the auxiliary or opens the passage between them and permits gravity flow when the temperature in the auxiliary exceeds its intended cool temperature. However, notwithstanding this feature of my invention, it is contemplated that the auxiliary refrigerator can be kept at a temperature equal or slightly above, if desired, to the available temperature of any master refrigerator.

Where the likelihood of additional need can be foreseen, a master refrigerator can be purchased at the start with an oversize cooling unit, if desired, and when the needs have expanded, additional refrigeration space, in accordance with the unit, can be added by means seen in some of the figures.

Nearly, if not all, of the existing master refrigerators are capable of supporting the auxiliary refrigerator of this invention with sufficient cold air for its proper or desired operation. Such refrigerators may be divided to advantage, as in Figures 1 and 2, into a master refrigeration section, which shall be capable of cooling to a temperature much lower than is desired for a large part of the intended content, and an auxiliary space requiring higher temperatures for satisfactory operation. The additional refrigerating space comprises auxiliary box capacity having direct air connection with the master refrigerating means, though it may be separated therefrom. The master refrigerating means is relied upon to supply additional cold air capacity which is circulated to or through the auxiliary refrigerating means.

In the form of Figures 1 and 2, a structure is shown which, though comprising insulating side walls 15 and 16, rear insulating wall 17, top and bottom insulating walls 18, 19 and 20 and front doors 21 and 22 is in effect divided by insulating partition 23 into two parts 24 and 25, the left compartment or section as seen in Figure 1 forming the master refrigerator for which the right hand compartment or section is an auxiliary. The master compartment has its own cooling unit shown diagrammatically as a motor 26 and compressor 27, and an expansion cooling chamber 28 connected with the compressor by tubes 29 and 30.

The refrigerator compartment or section 24 is herein treated as a "master" refrigerator because it is designed to cool and contain food and has an independent cooling element, whereas the compartment or section 25 is treated as an "auxiliary" refrigerator because it lacks independent cooling means and depends for its cooling wholly upon air circulated from the master refrigerator. It will be noted that this adds to the duty of the cooling element for the master but at a slight additional expense it permits maintenance of a temperature in the auxiliary which is sufficient for a large range of foods, whose cooling requirements are much less critical than the requirements of those for which the master refrigerator is designed.

The air circulation of the refrigerators takes place through one or more openings, passages or conduits, as the two openings 31 and 32 shown in Figure 1, through which air flows as controlled by a thermostat 33 located in the auxiliary to secure and maintain the desired temperature differential.

In the form of Figures 1, 2 and 3, the thermostat 33 closes a circuit through a motor 34 operating the fan 35. The circuit is shown extending between sources of supply 36 and 36' through the thermostat and the motor. Other figures show other arrangements.

If the openings 31 and 32 were open all the time the two sections of this refrigerator intended to operate at maintained differential temperatures as master refrigerator and auxiliary refrigerator, respectively, would soon become of approximately the same temperature through circulation due to gravity. For this reason my invention contemplates, wherever gravity air circulation can take place between the two refrigerators, closing the openings, passages or conduits, except when operation of the thermostat takes place due to rise of the temperature in the auxiliary refrigerator above its predetermined temperature.

There are various ways in which circulation of air between the refrigerators can be limited to those times when the thermostat operates. One way is shown in Figures 1, 2 and 3. The openings for circulation through the sleeves 37 are closed by plates 38, which are lightly spring pressed against the exposed faces of the openings for closure by spring 39 held to their duty by bolts 40, passing through spiders 41. When the thermostat closes the motor switch, the air driven by the fan pushes the plates outwardly in the direction of intended air flow, thus permitting the flow of the air from the master refrigerator into the auxiliary at one opening and from the auxiliary to the master at the other opening. In the illustration, the air additionally is given a downward direction by baffle 42 so as to cause a more thorough circulation in the auxiliary. During the operation of the motor there would also be a pressure differential action on the plate 38' sufficient to lift it from its seat and permit flow through the opening 31.

In the two refrigerator sections the shelves 43 are slotted or otherwise apertured or reticulated so as to allow passage of air through them with such freedom as the placing of the food containers permit.

The simple circulation outlined is complicated, of course, by the size of the air ducts, the desired temperature or range of temperature of the auxiliary, the temperature of the master refrigerator, the number and length of times the doors 20 and 21 and the door 44 to the freezing compartment are opened, the effectiveness of the insulation and other conditions to which normal refrigeration operation is subjected.

It will be clear that the extent and character of heat insulation in the form of Figures 1, 2 and 3, for example, will normally be adequate for the master refrigerator and might therefore exceed the standards which would normally be required for the auxiliary refrigerator.

In Figure 3a the circuit closed by the thermostat in the auxiliary is passed through a solenoid 45 supported on bracket 46. The solenoid armature 47 is connected directly to the plate 38. The plate 38 is thus positively opened against the resistance of compression spring 39. This thermostat control and positive opening of the closure plate takes place whether a motor fan such as that in Figure 3 be concurrently energized or not, and thus may provide for greater flow of fan driven air or for gravity air flow only. The connection 48 can be in parallel with the connections to the solenoid but can energize a fan motor such as seen in Figure 3 whereby fan circulation is relieved of the necessity for moving of closure plates.

In Figure 4 the structure is essentially the same as in Figures 1, 2 and 3, with the difference, however, that the auxiliary refrigerator is a separate unit having a separate side wall 15' which adjoins side wall 16' and the openings between are matched openings in the side walls 15' and 16'. The circulation is secured in the same way by thermostatic closure of a circuit through a fan motor against the very light pressure of a closure plate 38. The return of the air will pass through a second opening at the top, resiliently closed by a spring pressed plate 38'. In a similar manner to Figures 1, 2 and 3a, the assembly adapts itself nicely to gravity circulation in which instance thermostat 33 would operate solenoids to the closure plates or valves, which in Figure 4 are designated as 38 and 38'.

The structure of Figure 4 may be used where a master refrigerator has taken care of the needs of a user for a time at a capacity as needed. The auxiliary refrigerator is provided with a separate door not shown, corresponding to the door 20 in Figure 1. The matched openings through which sleeves 49 are passed may be put in at the time that the auxiliary refrigerator is added or may preliminarily be provided by initially closed openings 50 such as are shown in Figure 10, conveniently located for removal of temporary closure means, as outer plates and inner plugs of insulating material, and insertion of the sleeves.

Figure 4A:
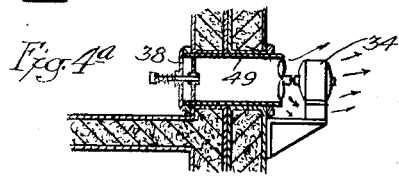

Figure 4a is a fragmentary section corresponding generally to Figure 4, but omitting the baffle and placing a suction pump in the less valuable space of the auxiliary refrigerator. While the suction pump is less forceful for the power exercised than is the pressure type it has an advantage in the centrifugal throwing effect of the air by the fan giving better distribution of the cooler air from the master refrigerator over the adjacent space of the auxiliary refrigerator when the baffle plate 42 is eliminated. The fan may be used in the auxiliary in other forms wherever the advantage is desirable, for example, in helping to distribute the cold air from the master throughout the auxiliary during the interchange of the air by means of gravity.

Figure 5 may represent a new installation as a single unit, comparable with that in Figure 1, or may represent an addition of an open faced auxiliary attached to an existing master refrigerator, the auxiliary being open at one side at 51 and the master having a single elongated vertical slot connection 52. In this illustration there is one communication only between the two refrigerators. This elongated opening houses a fixed frame 53 in which a damper 54 is pivoted at 55. The damper is turned by an arm 56 so that edges 57 and 58 of the swinging damper will seal against or be free from the rims 59 and 60 about the opening in the frame. The damper turns on pins 61. The arm 56 is spring biased lightly at 62 (Figure 6) normally to close. The thermostat 33 connects a source of current through solenoid 63 to draw the armature 64 and tilt the damper, permitting cold air of the master refrigerator to move, by gravity, into the auxiliary.

Much the same effect can be secured by two such openings, as are seen in Figure 1 or in Figure 4, with dampers which are spring biased towards closure, but which may be each separately drawn open by separate solenoids as in Figure 3a, the circuit being closed by the same thermostat or by separate thermostats, the air flow being by gravity or by a thermostatically energized fan or other air pump.

It will be noted that in Figure 5 there is no motor for the air circulation and that with thermostatic control to open the passage or passages, gravity actuation of this form of my invention is feasible. Separate check valve control by thermostat and solenoid for individual plates and actuation by gravity flow, or for use in connection with a pump, is seen in Figure 3a.

Figure 8:
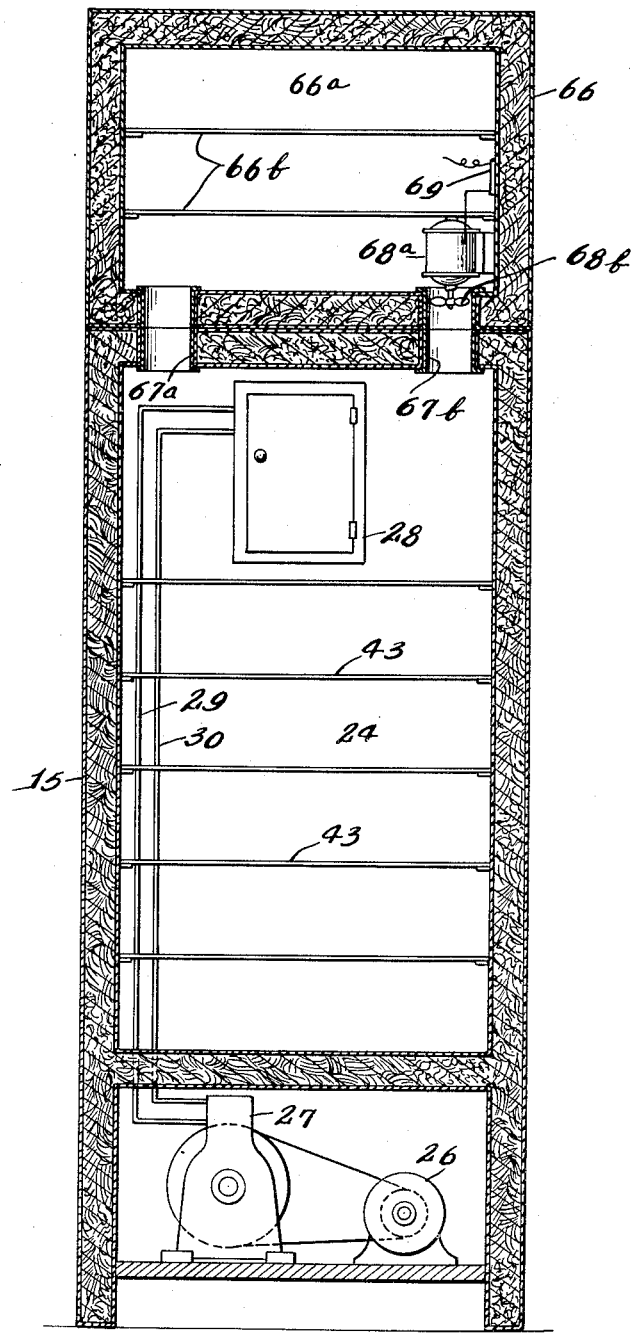

In the particular embodiment of my invention illustrated in Figure 8 a conventional master refrigerator, illustrated as of the same general type and character as that shown at the left in Figure 4, for example, is provided for additional auxiliary refrigerating storage space by auxiliary refrigerating means placed to the top rather than at the side thereof. This auxiliary refrigerating means is here illustrated as comprising insulated walls 66 providing an inner auxiliary food storage chamber 66a which may be provided with shelves 66b having openings therein to permit circulation of air.

Interconnecting passageways between the auxiliary and master refrigerating compartments are provided by spaced openings in the top thereof having the sleeves 67a and 67b therein. Power air circulating means is here shown as comprising pump means including a motor 68a and fan 68b, operation being controlled by a thermostat 69.

This form of my invention has several advantages. In the first place, where space alongside the refrigerator is at a premium, it provides additional auxiliary food storage space without requiring additional floor space. Another advantage of this form is that no positive closure means are required, positive control of air circulation being accomplished by the relative position of the master auxiliary and the provision of the fan or pump means. When the fan is not operating there is no tendency toward gravity circulation of the air, since the air in the auxiliary is warmer than that in the master, and the two bodies of air stratify, with no circulating currents being set up. Thus there is a positive cessation or prevention of gravity circulation when no further cooling effect in the auxiliary is desired. On the other hand, when the fan is started by control action of the thermostat 69, there is a positive or forced upward movement of air through the passageway associated with the fan, and a downward movement of air through the other opening or passageway, resulting in positive circulation and in cooling of the auxiliary storage compartment until the desired temperature is reached and the thermostat shuts off the fan, whereupon no further circulation takes place.

While the motor is shown as directly operated by the thermostat for purposes of simplicity, it will be understood that in practice the thermostat would generally control a motor relay which would in turn control the relatively heavy current flow to the motor, so that a light thermostat might be used, although a direct connection is perfectly satisfactory when a heavy duty thermostat is used.

Wherever the conditions make speed or considerable volume of air movement a desideratum, an air pump, such as an electric fan may be used along with a check valve or with damper or louver means at each opening which may be pressure opened or opened by thermal closure of a solenoid circuit, as desired. It is of course understood that such valves or dampers are only of particular necessity where gravity circulation of air would take place without their use.

It should be understood that wherever the law of natural air flow is applicable to cause a natural interchange of air between the master and auxiliary refrigerators, the use of a motor and fan or other means of forced air flow is not necessary, but, in every such case, where the compartment space of both refrigerators are equal or nearly equal in height and depth and where the passageway or passageways connecting the two are properly located for gravity circulation, in the first place at or near the ceiling and in the second place at or near the floor, an equalization of temperature between the two refrigerators would result unless the natural air flow was stopped. The intervention is best accomplished by means of a thermostatic solenoid operated valve, a fan opened, spring closed valve, or other power controlled closure of the openings, such as shown, for example, in Figure 3ª. Factors which, among others, normally affect gravity air circulation between the master and auxiliary refrigerators are the size, location and length of the passages, the time element, whether readjustments must take place quickly or may be left to quite gradual settlement, and the frequency of opening the master and the auxiliary.

In Figure 9 the conditions are those of Figure 4, except that the refrigerators are spaced apart far enough to require conduits for their air connections. The motor 34 is controlled by a thermostat 33. Accumulated pressure in the auxiliary finally opens the spring closures in the conduits.

The fact that the conduits in Figure 9 are without insulation is not intended to indicate that they are necessarily very short as the connections between the two refrigerators will necessarily be determined as to length, diameter and installation, whether there be a pump at the lower conduit, only, as indicated, or a pressure or suction pump at the approximate end of the upper conduit—of course, thermostatically operated—by the conditions of the case and the position where the two refrigerators most conveniently can be located, etc.

In the perspective of Figure 10 a refrigerator is shown that may be either a master or an auxiliary refrigerator. It is provided with initial openings 50 which have been temporarily closed by plates 70 and 70' as shown in Figure 10ª which is a cross section on line 10ª—10ª. The purpose and effect of the openings and plates is to facilitate the addition of an auxiliary refrigerator to a master refrigerator or a master refrigerator to an auxiliary refrigerator, as the case may be, by offering ready made, alternate positions for such additions with either the sides, back, top or bottom, the openings of which are correspondingly located.

When it is the intention to mount two of such different refrigerators, whether or not they are spaced by connecting conduits, the plates 70 and 70' are removed and their places are taken by the other connections for the other refrigerator, or by the conduits.

The openings shown in Figure 10 are in the top and one side only, but it will be understood that corresponding openings may be provided at the other walls—but not in the front doors— and at the bottom so that such units may be built up as desired.

It will be evident that the present invention is applicable to gas refrigerators as well as to electric refrigerators, so as to enlarge refrigeration facilities by ultimate additions of auxiliary refrigerators. Whether originally planned or not the refrigerators are installed, using power opening of valves between them to permit gravity air circulation and a thermostat to operate such valves through solenoid action, or pressure as well as suction pumping of air through the connection or through each of the connections provided, with thermostat control of such pumping, with such suction or pressure opening said valves, all as may be desired to provide air circulation between the master and the auxiliary refrigerators, or between the refrigerator and the outdoor air.

It will be evident that the present invention has very considerable advantages during the defrosting of a master refrigerator, since the auxiliary refrigerator affords a convenient and proper storage space for food from the master refrigerator, when at the start of the defrosting process the auxiliary refrigerator is cooled to a much lower temperature than that at which the master refrigerator will be operated during the defrosting, in fact equal or about equal to that of the master before the defrosting process was started. This permits the auxiliary to be used in place of the master and with about the same effect, during the defrosting of the master. For this purpose, the food is transferred from the master to the auxiliary, the thermostatic control is then adjusted to cut down any differential between the refrigerators, that is, to make the auxiliary the same or nearly the same temperature as the master under normal operation. The food is kept in the auxiliary refrigerator during the defrosting period, the thermostatic control being turned up high enough to prevent any interchange of air between the units during the period of defrosting of the master. The master is then made operative to its normal temperature, the food is returned from the auxiliary and the operation of the master and auxiliary together is resumed.

Different users, of course, will have different ideas as to the temperature at which an auxiliary refrigerator should operate and the same adjustability of the thermostat just referred to makes my invention satisfactory to users having widely different ideas regarding the temperature differential, if any, which should be maintained between the master refrigerator and the auxiliary in normal operation.

Because of the relatively high temperatures at which the auxiliary refrigerators may be operated and the comparatively small difference in temperature between their contents and the atmospheric temperature of the rooms in which they will be operated, the insulation needs of the auxiliary refrigerator will not be exacting and containers having inferior type of insulating walls may be used.

Figures 11, 12, 13, 14 and 15, are perspective views of different details of structure in which master refrigerators of the "quick-freezing" type are used with an adjacent structure in each case serving as an auxiliary refrigerator.

It will be noted that there are marked similarities between the structures of Figures 11 to 15, and the preceding structures, notwithstanding that Figures 11 to 15 emphasize master refrigerators having quick freezing features. While this has not been emphasized in the earlier structures, it could be present in them.

In the structures of Figures 11 to 15 the freezing cabinets act as master refrigerators in that they are designed to contain food and have cooling units of their own. The cold air is taken from them to cool the contents of an auxiliary refrigerator or refrigerators and because of the lower freezing temperatures made possible in such master refrigerators, in many instances as low as −15° F., the temperature of the auxiliary refrigerator can be easily maintained to the equal of any domestic household master refrigerator, or, for example, a freezing or lower than freezing temperature and such an arrangement makes possible a more versatile auxiliary refrigerator.

The master refrigerator of the quick freezing type or freezing cabinet type are used commonly in serving meats and ice cream commercially and for freezing foods in the home. They may or may not be of a large capacity, but have the capability of not only freezing foods but of maintaining them in freezing condition or refreezing them.

In Figure 11 the master refrigerator 71 affords a base for end portions 72 and 73 of the auxiliary refrigerator 74. The end portions 72 and 73 when given sufficient cross section, may to great advantage house shelves 75 or drawers 76 or other supports for foods, the supports and shelves being so designed as to permit free air circulation. According to their position, close to the outflow of cold air from the master refrigerator or close to return of warm air from the auxiliary refrigerator, these base ends or pedestals may substantially duplicate, in temperature ranges recognized in domestic master refrigerators, such as had been dealt with chiefly in the earlier part of this case or may substantially duplicate in temperature ranges, the auxiliary refrigerator as dealt with heretofore in this specification. Withdrawal from the master refrigerator under thermostatic control, withdrawal from the pedestal also under thermostatic control and in general the speed of feed of the air in its passage from one end of the auxiliary to the other may be used largely to control the temperatures available.

In Figure 11, either or both ends of the pedestals may be provided with floors such as are shown at 77 in the left pedestal and at 78 at an intermediate point in the right pedestal, the floors being provided if desired, with thermostatically opened control checks 79 and 80 such as are shown in Figure 3a. Gravity circulation cannot take place where the air below the auxiliary is cold and the auxiliary air is warm so air circulation must be forced by pressure air pump or induced by what becomes a suction air pump 81 when considered with respect to the air control valve 80. However the pump 81 which is a pressure pump with regard to the middle section of the upper structure auxiliary refrigerator as shown, would be a suction pump if applied to the upper face of check valve 80 or a pressure pump if applied to the lower face.

If it be the intention to use the compartment 82 above the floor 78 effectively as part of the auxiliary and to include the space 83 and the compartments 84, 85 and 86, all accessible to doors 87, 88 and 89, the pumping mechanism for effecting air circulation can be disposed, preferably, at the floors 77 and 78 or may be operated at the vertical walls 90 and 91. For the purpose of suggesting this, valves have been shown at 79 and 92 on the one side and 80 and 93 on the other side, the temperature at 92 being subject to thermostatic control.

It will be evident that the thermostatic regulators may be located where a particular temperature may be considered vital or where the temperature to which the regulators are set is considered typical in the normal auxiliary refrigeration use. The thermostat regulator should have a range from the minimum temperature of the master refrigerator to the maximum temperature desired in the auxiliary refrigerator, as in the neighborhood of 20 to 70° F., within which range adjustments may be made. On the other hand where there is no intention of making the adjustment of the auxiliary temperature provide for use of the auxiliary to serve as master refrigerator during defrosting or at other times, there is no reason why standard equipment cannot be determined upon which will serve the bulk of the demand without necessity for adjustment. Obviously there can be types not only to serve as auxiliaries with standard master refrigerators and without necessity for adjustment but there can also be standard structures of the general form of quick freezing types, as shown in Figures 11 to 15 where very different temperature ranges are accommodated without necessity for adjustment of the thermostat and to be used in connection with quick freezing types of master refrigerators. It is clear that each of these different situations comes within the teaching of this invention, notwithstanding that different specific needs are served.

The master refrigerator 71 in Figure 11 is of a well known type of quick freezing unit, having a plurality of lids or covers 94 in connection with whose use the auxiliary refrigerator may cooperate to advantage. It should be understood that where various temperatures in the several compartments of the auxiliary refrigerator are not desired, the walls 90 and 91 may be left out along with valves 79 and 80 and the thermostatically controlled motor and fan 81 may be located at an aperture in the floor 77 or 78. The opposite floor as the case may be, would be made accessible to air flow through an aperture or through a floor composed of lattice or wire mesh or other air-passable construction. If an aperture, which is the most desirable form of opening, is provided, the diameter of the aperture should preferably be about 75% smaller than the diameter of the motor fan inlet. Such an arrangement is desirable wherever forced air circulation between the master and auxiliary refrigerators is resorted to, the object being to create better equalization of the temperature in the auxiliary through the added pressure induced and to use this pressure in the auxiliary and the resultant added vacuum created in the master refrigerator as an increased means of opening resilient spring valves whenever it is thought advisable to use such valves to control the apertures.

In Figure 12 the auxiliary refrigerator is composed of the longitudinal body 97 and the vertical supports 95 and 96 all accessible through doors 98. The pump 99 is controlled by thermostat 101. It is to be noted that a single passageway is formed through the two vertical supports and the longitudinal body.

In Figure 13 the auxiliary refrigerator is shown as accessible to doors corresponding, generally, to the structure in Figure 12. Air inlet and outlet openings are at heads at the two ends, the one head being shown at 102. Of the four supports shown for the auxiliary, two are shown at diagonal corners as providing connections for passage of air, up in 103 and down in 104. The corner posts 105 are shown as blind. Air circulation is shown as due to air pump 106 operated by the closing of an outside circuit through the electric motor by means of thermostat 107. The grids or shelves 109, while supporting articles, permit free passage of air through the shelves to pass the articles.

Where the master refrigerator, containing as it does very cold air, lies wholly below the warmer auxiliary, there is no need for check valves against air circulation at the openings therebetween, unless it is contemplated to lower the temperature of the auxiliary and raise the temperature of the master, as in the defrosting process explained heretofore. It would therefore be optional as to whether check valves should or should not be used.

An auxiliary which may correspond, generally, with that in Figure 13 may be supported by one or more vertical plates at each end. Where two plates 110 as shown in Figure 13a are used, they are located at opposite sides of the conduits or single conduit at that end, 103 or 104. The conduits are thus protected by the plates. All support posts or passages through which air circulation is contemplated should, preferably, be as well insulated as the auxiliary refrigerator, which should, preferably, be sufficiently insulated for the purpose of its use.

Figure 14:
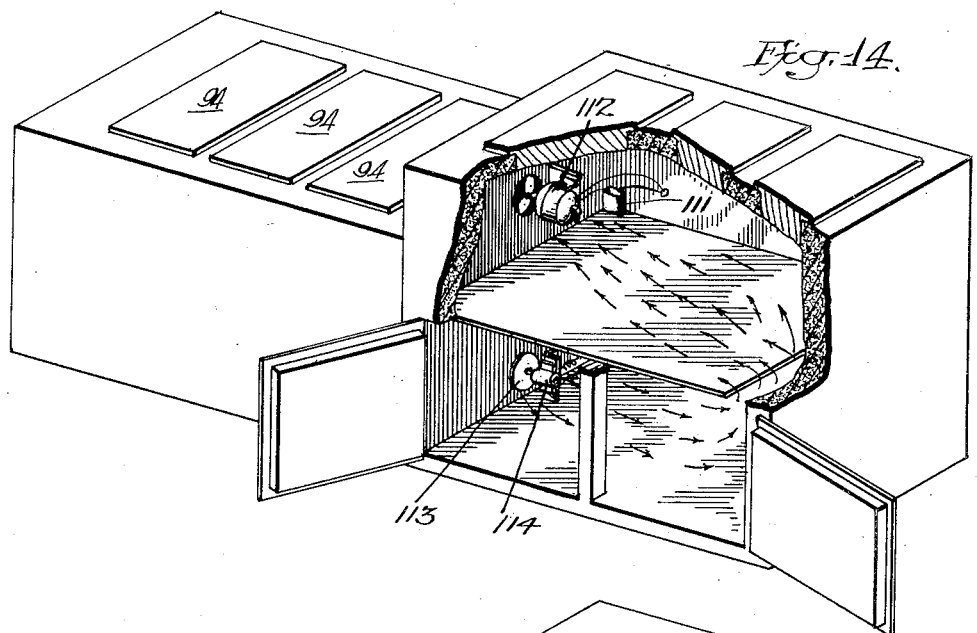

In Figure 14 I show a master refrigerator of the quick freezing type, at the left, which is well known in the art, and a connected auxiliary refrigerator of this invention, at the right. While I show a motor-fan 112 at the top aperture connecting the auxiliary to the master refrigerator, the arrangement is, nevertheless, an ideal one for gravity air circulation between the two refrigerators, one in which the motor-fan forced air circulation may be eliminated.

Explaining the gravity air circulation arrangement, I connect thermostat 111 to solenoids 114 and 114$^a$ operating check valves 113 and 113$^a$, it being understood that the check valve 113$^a$ and solenoid 114$^a$ would replace the motor-driven fan arrangement 112 where circulation was to be entirely of the gravity type.

While the primary purpose of the auxiliary refrigerator is to protect foods that require temperatures which may be higher than that contained in master refrigerators, thereby consuming but very little cold air from the connected master refrigerator, it is evident that the auxiliary can be equalized in temperature with the master refrigerator. It is also evident that, through valve manipulation controlling the passageways of air circulation between the master and auxiliary and particularly so when the position of the refrigerators, one to the other, is such as to enable gravity circulation of air between them and especially when such circulation can be obtained at the lower space of the refrigerators, various temperatures from the low of the master refrigerator to the higher temperatures desired for auxiliary refrigeration operation can be secured in a single auxiliary refrigerator.

It is desirable at times and for various reasons to relieve the master refrigerator, particularly when such refrigerators have been designed for quick freezing of foods, of some of their contents, but to keep the foods removed in a frozen condition. The auxiliary refrigerator, such as shown, for example, in Figure 14 can be used to accomplish this purpose, presuming that the master refrigerator with which it is in contact is refrigerated by a quick freezing unit. The valve 113 can be thermostatically regulated by thermostat 111 through solenoid 114 to permit cold air to be circulated from the master to the lower compartment space of the auxiliary so as to enable frozen food to be contained in the space to which this cold air is confined, to remain in a frozen condition.

While the upper space of the auxiliary can be used in a similar manner and for the same purpose, it might be more desirable to maintain a higher temperature there, for foods which are not to be kept in a frozen condition, as by provision of an additional higher unperforated shelf tending to stratify the air in the auxiliary.

Figure 15:
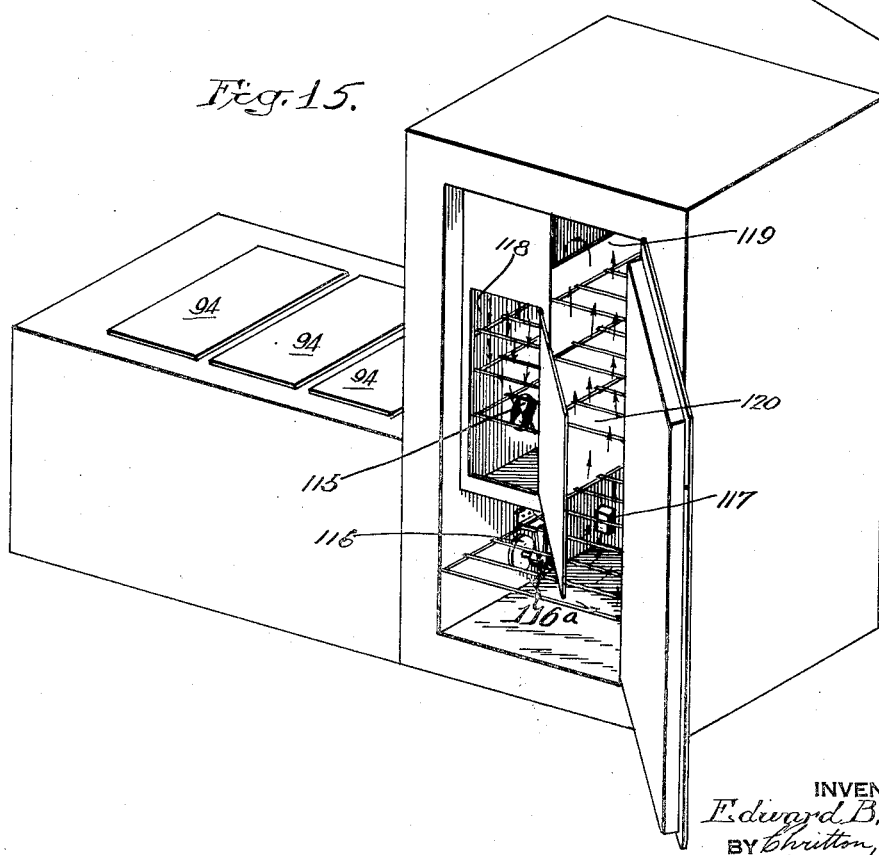

In Figure 15 an inner compartment, opening at the top is shown within an outer compartment or auxiliary refrigerator. A motor and fan 115 with a solenoid 116$^a$ operating a check valve 116 is shown controlled by thermostat 117. A spring-pressed check valve may be used in place of 116 thus eliminating solenoid 116$^a$. With the described valve, thermostatically operated, applicant can have a temperature at the bottom space of the auxiliary such as normally present in domestic master refrigerators or lower if desired. The motor-fan-valve arrangement of the higher duct can have the desired temperature for the upper space thermostatically controlled while the temperature of the lower space of the auxiliary can be controlled thermostatically by a valve-solenoid permitting the lower duct to operate under gravity controlled circulation and which would permit of a cool and a cold space.

In Figure 15a thermostatically controlled air pump 115 forces air from the inner compartment 118, which may be through a concurrently opened control valve 113a, as in Figure 3a, relieving the pressure within the space 119 so as to induce a flow of cold air through the thermostatically opened check valve 116 up through the side passage 120. A thermostat is shown at 117 and the solenoid opening means for the valve 116 may correspond with that shown in Figure 3a.

It will be evident that there is an advantage in locating an air pump, whether of pressure or suction type, within the path of air circulation and that the exact position of the pump is less important than that it shall be somewhere within the intended flow. For example, presuming that the only duct connecting the master to the auxiliary refrigerator was the passageway controlled by valve 116 in turn controlled by thermostat 117 through solenoid 116a with the motor-fan operated concurrently with the valve 116, by means of thermostat 117. In this arrangement the motor-fan could be located on the floor of the outer compartment, preferably in such a position as to force the cold air entering the auxiliary through the passageway by means of gravity circulation, upwards. We would then accomplish through motor-fan distribution of cold air an equalized temperature throughout the auxiliary refrigerator.

It is also evident that the flow of cold air may be pumped through openings without check valves or other air passage control where reliance for control can be placed upon the fact that the cold air cannot circulate except as it is lifted upwards by pump or other force and where gravity circulation of this cold air afterwards is not possible or if not possible is not objectionable. I also provide for gravity circulation through openings which are guarded by check valves but in which the check valves are opened and held open electrically to permit gravity circulation, opened and held open for fan (pump) circulation, or in which the opening of the check valve is effected by the pressure created by the fan itself and all to a predetermined temperature in the auxiliary refrigerator.

It will be evident that in the distribution of the pumps, thermostats and passages, with or without thermostatic operation, a very nice adaptation of the invention to any particular needs may be made by placing the thermostat or thermostats in that or those positions within the path of flow which for the particular installations are deemed to be most critical.

It will be evident that the relative heights of the master refrigerator to the auxiliary refrigerator makes forced air circulation imperative where the auxiliary is too high as it pertains to the master to utilize or properly utilize gravity air circulation.

It will be evident that capacity and volume of air to be handled on the one hand and speed and operation required on the other affect the selection of the circulatory means and the diameter of the connecting openings, requiring pumping of the air in one case and permitting gravity circulation in another.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. Refrigerating apparatus including: a master refrigerator having a cooling unit; an auxiliary refrigerator lacking a cooling unit and communicating with the master refrigerator; a resilient closure for the communication between the two refrigerators; an electrically operated pump adapted to overcome the closing pressure of the closure and cause flow of air between the refrigerators; and a thermostat in the auxiliary refrigerator controlling the operation of the pump.

2. In a refrigerating system; a cooling unit; a compartment cooled directly by said unit; an auxiliary compartment, there being apertures between the two compartments; spring closing means between the compartments for closing the apertures, adapted to open in the direction of desired air flow; and an electrically operated pump causing flow from the main compartment to the auxiliary compartment against the spring pressure; and thermostatic means in the auxiliary compartment for controlling operation of the pump, whereby the temperature in the auxiliary compartment may be maintained above that in the main compartment, with flow of cooled air therebetween to maintain this temperature.

3. Refrigerating apparatus including: a master refrigerator having a cooling unit; an auxiliary refrigerator lacking a cooling unit, there being passages between them at different levels for flow of cool air from the master refrigerator to the auxiliary refrigerator and return; spring closure means in one of the passages preventing gravity air flow between the two refrigerators; an electrically operated pump causing flow of cool air between the refrigerators overcoming the pressure of the spring closure; and a thermostat in the auxiliary refrigerator controlling the operation of the pump, said thermostat and pump being adapted to be connected to a source of electrical supply.

4. Refrigerating apparatus including: a master refrigerator having a cooling unit; an auxiliary refrigerator lacking a cooling unit, there being passages between the two; a damper in one of the passages resiliently closing the passage; an electrical pump for causing flow of air through the passage to push the damper open and cause flow of air between the two refrigerators; a thermostat in the auxiliary refrigerator; and connections for the thermostat adapted to be connected to a source of current for starting and stopping the pump.

5. Refrigerating apparatus including: a master refrigerator compartment having a cooling unit; an auxiliary refrigerator compartment lacking a cooling unit and communicating with the master compartment; a closure for the communication between the two compartments, said closure being normally urged to closed position; an electrically operated pump adapted to overcome the closing pressure of the closure and cause flow of air between the compartments; and a thermostat in the auxiliary compartment for controlling the operation of the pump.

6. Refrigerating apparatus including: a master refrigerator compartment having a cooling unit; an auxiliary refrigerator compartment lacking a cooling unit and communicating with the master compartment; a closure for the communication between the two compartments, a solenoid mounted adjacent said closure; a single member providing a direct connection between said solenoid and closure to move said closure bodily in a straight line upon energization of said solenoid; pumping means by which air from the master compartment is circulated within the auxiliary compartment; and thermostat means for controlling the energization of the solenoid and pump when the temperature of air in the auxiliary compartment rises above a predetermined value.

EDWARD B. JAEGER.

REFERENCES CITED

The following references are of record in the file of this patent:

UNITED STATES PATENTS

| Number | Name | Date |
|---|---|---|
| 1,830,305 | Walsh | Nov. 3, 1931 |
| 1,910,504 | Sellman | May 23, 1933 |
| 1,932,696 | Heydthausen | Oct. 31, 1933 |
| 2,040,634 | Sekyra | May 12, 1936 |
| 2,042,384 | Bird | May 26, 1936 |
| 2,165,480 | Hastings | July 11, 1939 |
| 2,213,274 | Flamm | Sept. 3, 1940 |
| 2,222,543 | Schmidt | Nov. 19, 1940 |
| 2,259,803 | Cumming | Oct. 21, 1941 |
| 2,290,647 | Lowell | July 21, 1942 |
| 2,312,325 | Earle | Mar. 2, 1943 |
| 2,346,287 | Borgerd | Apr. 11, 1944 |
| 2,393,238 | Dailey | Jan. 22, 1946 |
| 2,414,588 | Elliott | Jan. 21, 1947 |
| 2,444,887 | Wyeth | July 6, 1948 |
| 2,462,279 | Passman | Feb. 22, 1949 |
| 2,467,427 | Green | Apr. 19, 1949 |